UNITED STATES PATENT OFFICE.

EUGEN LANGEN, OF COLOGNE, GERMANY, ASSIGNOR TO F. O. MATTHIESSEN AND WIECHER'S SUGAR-REFINING COMPANY, OF JERSEY CITY, N. J.

IMPROVEMENT IN THE MANUFACTURE OF HARD SUGAR.

Specification forming part of Letters Patent No. 163,667, dated May 25, 1875; application filed March 17, 1875.

*To all whom it may concern:*

Be it known that I, EUGEN LANGEN, of Cologne, in Empire of Germany, have invented a certain new and useful Improvement in the Manufacture of Hard Sugar, of which the following is a specification:

My invention relates to the conversion of granular sugar into hard sugar; and consists in treating granular sugar with a strong sugar solution or concentrated sugar-sirup, and then heating it for the purpose of superficially dissolving the crystals. The heated mixture, after being thoroughly stirred, is filled into molds, wherein it cools and hardens, and is afterward treated in the usual way in a centrifugal machine, and with the claying liquor for purifying it. The object of my mode of treatment is to fill the interstices in the mass of granular sugar with a material which answers the purpose of a cement and binds the crystals together, and also crystallizes itself in the insterstices and fills them up, and thus converts the segregated crystals into a mass of solid sugar.

By my process the necessary additional quantity of sugar material is introduced into the interstices, and the grains of sugar are superficially dissolved by the heat which is applied, so that the whole mass, in cooling, crystallizes into a body of hard sugar.

The common mode of making the crystals or grains of sugar adhere to each other has been to treat it with the strong sugar solution. I do not, therefore, claim broadly the use of the sugar solution for the purpose of giving the requisite adhesiveness to the crystals of granulated sugar, the distinguishing characteristic of my invention being the heating of the granular sugar mechanically mixed with the sugar solution, for the purpose of thoroughly incorporating the whole into a solid homogeneous body.

I claim as my invention—

The improved process of converting granular sugar into hard or loaf sugar herein described, which consists in subjecting granular sugar, when mechanically mixed with a strong sugar solution, to heat, for the purpose of superficially dissolving the sugar-crystals, and then cooling and hardening the mass in molds, in the ordinary manner.

EUGEN LANGEN.

Witnesses:
    C. KURTZ,
    FRITZ SCHEIBLER,